US006649214B2

(12) United States Patent
Athey et al.

(10) Patent No.: US 6,649,214 B2
(45) Date of Patent: *Nov. 18, 2003

(54) COMPOSITIONS AND METHODS FOR FORMING COATINGS OF SELECTED COLOR ON A SUBSTRATE AND ARTICLES PRODUCED THEREBY

(75) Inventors: Patricia Ruzakowski Athey, Pittsburgh, PA (US); Luke A. Kutilek, Oakmont, PA (US); John B. Slobodnik, New Kensington, PA (US)

(73) Assignee: PPG Industries Ohio, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,702

(22) Filed: Mar. 17, 1999

(65) Prior Publication Data

US 2002/0015785 A1 Feb. 7, 2002

Related U.S. Application Data

(63) Continuation-in-part of application No. 08/992,484, filed on Dec. 18, 1997, now Pat. No. 6,312,790.
(60) Provisional application No. 60/096,415, filed on Aug. 13, 1998.

(51) Int. Cl.[7] .............................. B05D 5/06; B05D 3/02; B05D 5/00
(52) U.S. Cl. ................... 427/162; 427/226; 427/419.1; 427/419.2; 427/419.3; 427/419.4; 427/419.6
(58) Field of Search ................................. 427/226, 162, 427/164, 419.1, 419.2, 419.3, 419.4, 419.6; 478/428, 432, 448, 467, 472, 472.1, 697, 699, 701, 702

(56) References Cited

U.S. PATENT DOCUMENTS

| 2,208,446 A | 7/1940 | Baughman |
| 2,676,114 A | 4/1954 | Barkley .................... 117/38 |

(List continued on next page.)

FOREIGN PATENT DOCUMENTS

| EP | 0 060 747 | 9/1982 |
| EP | 0 060 780 | 9/1982 |
| EP | 0 114 282 | 8/1984 |
| EP | 0 511 044 | 10/1992 |
| EP | 0 967 182 | 4/2001 |
| GB | 866332 | 4/1961 |
| JP | 08-325035 | 12/1996 |
| WO | 99/31024 | 6/1999 |

OTHER PUBLICATIONS

Schmahl, Von Norbert G. et al., "Gleichgewichtsstudien an ternaren Oxidsystemen des Kupfers", *Zeitschrift fur anorganische und allgemeine chemie*, Band 332, 1964, pp 12–24 (Plus Translation) (No Mo.).

(List continued on next page.)

Primary Examiner—Shrive P. Beck
Assistant Examiner—Michael Cleveland
(74) Attorney, Agent, or Firm—Andrew C. Siminerio

(57) ABSTRACT

A copper containing component and a manganese containing component are applied onto the surface of a substrate to form a coating having a selected ratio of copper to manganese to form a desired color. For a brown color, the film molar ratio of copper to manganese is above 1; for an amber color, the molar ratio is below 1, and for a blue color the film molar ratio is about 1. Further, color shifting of a multi-component coating upon subsequent heat treatment is minimized or prevented by determining the most mobile species in the coating and then placing a concentration gradient layer of an oxide of that mobile species between the substrate and the coating.

24 Claims, 4 Drawing Sheets

U.S. PATENT DOCUMENTS

| | | | |
|---|---|---|---|
| 3,004,875 A | | 10/1961 | Lytle |
| 3,244,547 A | | 4/1966 | Orr et al. |
| 3,305,336 A | | 2/1967 | Browne et al. |
| 3,455,722 A | | 7/1969 | Kushihashi |
| 3,658,568 A | * | 4/1972 | Donley ...................... 106/1.22 |
| 3,660,061 A | | 5/1972 | Donley et al. |
| 3,850,665 A | | 11/1974 | Plumat et al. .............. 117/33.3 |
| 3,894,883 A | | 7/1975 | Franz |
| 3,931,790 A | | 1/1976 | Franz |
| 4,072,772 A | | 2/1978 | Franz |
| 4,111,150 A | | 9/1978 | Donley et al. |
| 4,129,434 A | * | 12/1978 | Plumat et al. .............. 427/162 |
| 4,138,284 A | | 2/1979 | Postupack ................... 156/100 |
| 4,147,556 A | | 4/1979 | Donley ................. 106/287.18 |
| 4,160,061 A | | 7/1979 | Okino et al. |
| 4,208,446 A | | 6/1980 | Postupack et al. |
| 4,401,474 A | | 8/1983 | Donley ...................... 106/243 |
| 4,568,578 A | | 2/1986 | Arfsten et al. ................ 428/34 |
| 4,719,126 A | | 1/1988 | Henery |
| 4,719,127 A | | 1/1988 | Greenberg |
| 4,735,861 A | | 4/1988 | Carlson ...................... 428/432 |
| 4,857,367 A | | 8/1989 | Thorn et al. |
| 4,964,923 A | * | 10/1990 | Takeuchi et al. ............ 148/276 |
| 5,322,540 A | | 6/1994 | Jacquet et al. .............. 65/60.2 |
| 5,393,593 A | | 2/1995 | Gulotta et al. |
| 5,669,976 A | | 9/1997 | Yuuki et al. |
| 5,693,134 A | * | 12/1997 | Stephens .................... 106/415 |
| 5,780,149 A | * | 7/1998 | McCurdy et al. ........... 359/359 |

OTHER PUBLICATIONS

Zelazowska, E., "Study of metal oxide and titanium oxinitride coatings on soda–lime glass", *Glass and Ceramic Institute, Poland*, pp. 5–7 (No Date).

Vandenberghe, R. E. et al., "On the Stability of the Cubic Spinel Structure in the System Cu–Mn–O", *MAT. RES. BULL.* vol. 8, pp. 571–580, 1973.

Beley, M. et al., Kinetics of Redox Couples at Solid Electrodes: II–Ferro–Ferricyanide System in Nearly Neutral Media on Rotating Disk Electrodes of Polycristalline Spinel Manganites $Cu_xMn_{3-x}O_4$, with x=1.2, *Berichte Der Bunsen–Gesellschaft Fur Physikalische Chemie*, Band 79, 1975, Nr. 4, pp. 317–322.

Schmahl, Von Norbert G. et al., "Gleichgewichtssudien an ternaren Oxidsystemen des Kupfers", *Zeitschrift fur anorganische und allgemeine Chemie*, Band 332, 1964, pp 12–24.

Driessens, F. C. M. et al., "Phase Equilibria in the System Cu–Mn–O", *Zeitschrift fur anorganische und allgemeine chemie*, Band 351, 1967, pp. 48–62.

Devale, A. B. et al., "$CuAlMnO_4$ From Two Different Combinations and Their Structural and Electrical Study", *Bull. Mater. Sci.*, vol. 2, Number 2, May 1980, pp. 135–138.

* cited by examiner

COMPOSITIONS AND METHODS FOR FORMING COATINGS OF SELECTED COLOR ON A SUBSTRATE AND ARTICLES PRODUCED THEREBY

CROSS REFERENCE TO RELATED APPLICATIONS

This application is a continuation-in-part of U.S. patent application Ser. No. 08/992,484 filed on Dec. 18, 1997, now U.S. Pat. No. 6,312,790, and entitled "Methods and Apparatus for Depositing Pyrolytic Coatings Having a Fade Zone Over a Substrate and Articles Produced Thereby", the disclosure of which is hereby incorporated by reference. This application also claims the benefits of U.S. Provisional Application Ser. No. 60/096,415, filed on Aug. 13, 1998, and entitled "Methods and Apparatus for Forming a Graduated Fade Zone on a Substrate and Articles Produced Thereby", the disclosure of which is hereby incorporated by reference.

BACKGROUND OF THE INVENTION

1. Field of the Invention

The invention relates generally to compositions and methods for forming coatings of selected color on a substrate and more particularly varying the components in aqueous suspensions of organometallic compositions and depositing the suspensions onto a glass substrate to pyrolytically produce a stable coating film of selected color or colors on the glass substrate.

2. Description of the Currently Available Technology

In various industrial applications, it is desirable to form a coating on glass surfaces. For example, automotive windshields have coated areas known as "shade bands" or "fade zones". In many passenger vans, the back seat and rear windows are coated with a uniformly thick coating. These coated areas reduce visible, infrared or ultraviolet light transmittance to reduce glare, the visibility of the contents of the vehicle and/or decrease solar energy transmittance to reduce heat gain in the interior of the vehicle.

One method for forming coatings on a glass substrate is by the pyrolytic deposition of metal oxide films. In U.S. Pat. No. 3,660,061 to Donley et al., the disclosure of which is herein incorporated by reference, organometallic salts, such as acetylacetonates, are dissolved in an organic solution and are sprayed onto a hot glass surface to form a metal oxide film. In U.S. Pat. No. 4,719,127 to Greenberg, the disclosure of which is incorporated by reference, aqueous suspensions of organometallic salts are sprayed onto a hot glass surface to pyrolytically form metal oxide coatings on the surface.

The presently available coating technology is used to form gray or dark gray coatings, particularly in the automotive industry, so that the coated glass can be used with the widest number of automobile body colors without "clashing" with the automobile body color. Additionally, many of the known coated substrates change color or shade upon subsequent heating during tempering and shaping of the coated substrate. This heat induced color shift makes it difficult to produce coated materials of consistent color stability. Further, many of the known coated substrates are not chemically durable e.g. when contacted with solutions having citric acid.

As can be appreciated, it would be advantageous to provide compositions and methods for applying coating(s) of selected transmitted color onto the surface of a substrate which reduce or eliminate the limitations associated with presently known compositions and methods.

SUMMARY OF THE INVENTION

This invention related to a method for forming a coating, e.g., a copper and manganese containing coating, of a desired color on a substrate, e.g., a glass substrate by applying a copper containing component and a manganese containing component onto the substrate in a selected ratio to form the coating having the selected ratio of copper to manganese. More particularly, when the ratio of copper containing component and the manganese containing component is one, the coating is blue in transmission. When the ratio of the copper containing component and the manganese containing component is less than about one, the color varies from gray blue to amber in transmission as the ratio decreases. When the ratio of the copper containing component and the manganese containing component is greater than about one, the color varies from gray blue to brown in transmission as the ratio increases.

The invention further relates to compositions for forming coatings of a selected color on a substrate. Copper and manganese containing coatings may be used to form coatings ranging from amber to blue to light brown depending upon the copper to manganese ratio. A chromium, copper and manganese system provides a neutral gray colored coating in transmittance. Cobalt may be added to this copper and manganese system to increase chemical durability e.g. the citric acid durability of the coating. An iron oxide system provides a golden colored coating in transmittance. Copper may be added to this iron oxide system to provide a light grayish-brown colored coating in transmittance. Chromium may be added to the copper iron oxide system to provide a darker grayish-brown colored coating in transmission. A manganic oxide ($Mn_2O_3$) coating provides a mauve/lavender colored coating while a film having an ($Mn^{++}$) ($Mn^{+++}$)$_2O_4$ phase provides a light amber colored film. ($Mn^{++}$) ($Mn^{+++}$)$_2O_4$ will be referred to as "$Mn_3O_4$".

The invention still further relates to a method of preventing color shifting of a multi-component or multi-layer coated substrate upon subsequent heat treatment includes the steps of determining the most mobile species in a layer of the coating and placing a concentration gradient layer of an oxide of that mobile species between the substrate, e.g., a glass sheet, and the coating. The concentration gradient layer is preferably applied directly on the glass substrate but may also be applied on a coating layer formed on the glass substrate. Upon subsequent heat treatment, the mobile species in the concentration gradient layer diffuses into the substrate more readily than the mobile species in the coating, which minimizes depletion of the mobile species from the coating and reduces or eliminates an increase in transmittance.

DESCRIPTION OF THE PREFERRED EMBODIMENTS

For purposes of the description hereinafter, the terms "near", "far", "upper", "lower", "right", "left", "vertical", "horizontal", "top", "bottom", "above", "below" and derivatives thereof shall relate to the invention as it is described in the following specification. It is to be understood that the invention may assume various alternative variations and step sequences, except where expressly specified to the contrary. It is also to be understood that the specific methods, compositions, devices and articles described in the following specification are simply exemplary embodiments of the invention. Hence, specific dimensions and other physical characteristics related to the embodiments disclosed herein are not to be considered as limiting to the invention.

In forming a shade band or fade zone on a substrate, it may be desirable to form the fade zone of a selected transmitted color. This may be of particular importance for automotive windows, so that the color of the automobile windows is aesthetically pleasing with respect to the color of the automobile. In this regard, embodiments of the invention include coating compositions and methods which can be used to form a coating of a selected transmitted color or colors on a glass substrate. These compositions and methods may be used with conventional coating devices, such as but not limited to, conventional chemical vapor deposition (CVD), PVD, MSVD or pyrolytic coating devices. Examples of such conventional coating devices are disclosed in U.S. Pat. Nos. 2,676,114; 3,004,875 and 4,138,284, the disclosures of which are herein incorporated by reference.

Alternatively, the compositions and methods of the instant invention may be practiced according to the apparatus and methods disclosed in copending U.S. patent application of the same non-provisional filing date entitled "Methods and Apparatus For Forming A Graded Fade Zone On A Substrate And Articles Produced Thereby", the disclosure of which is herein incorporated by reference. The apparatus in this CO-pending application are generally shown in FIGS. 1–5 and will be briefly discussed hereinbelow.

Figure 1:
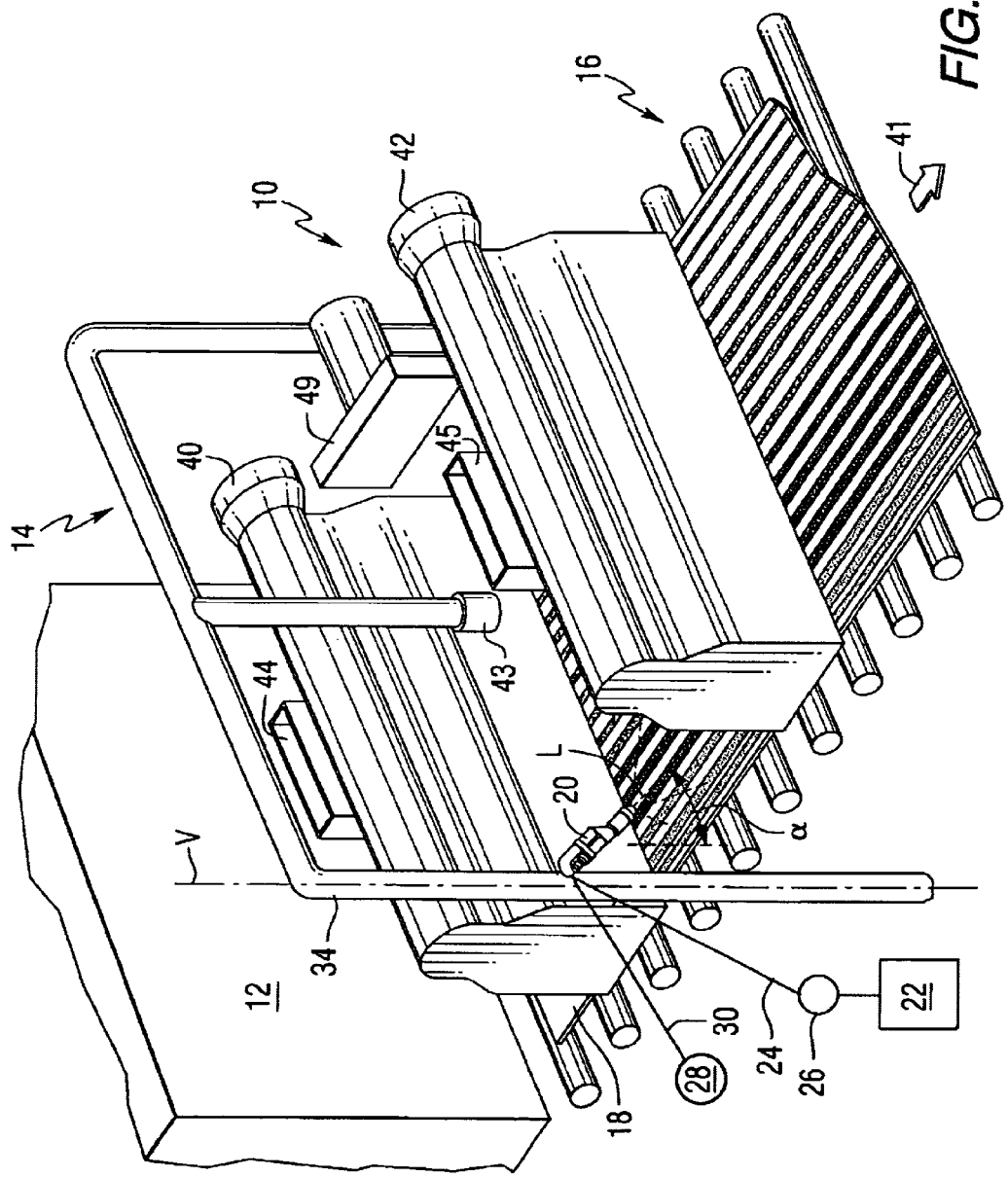
FIG. 1 is an isometric view of a coating station embodying features of the invention.
Figure 2:
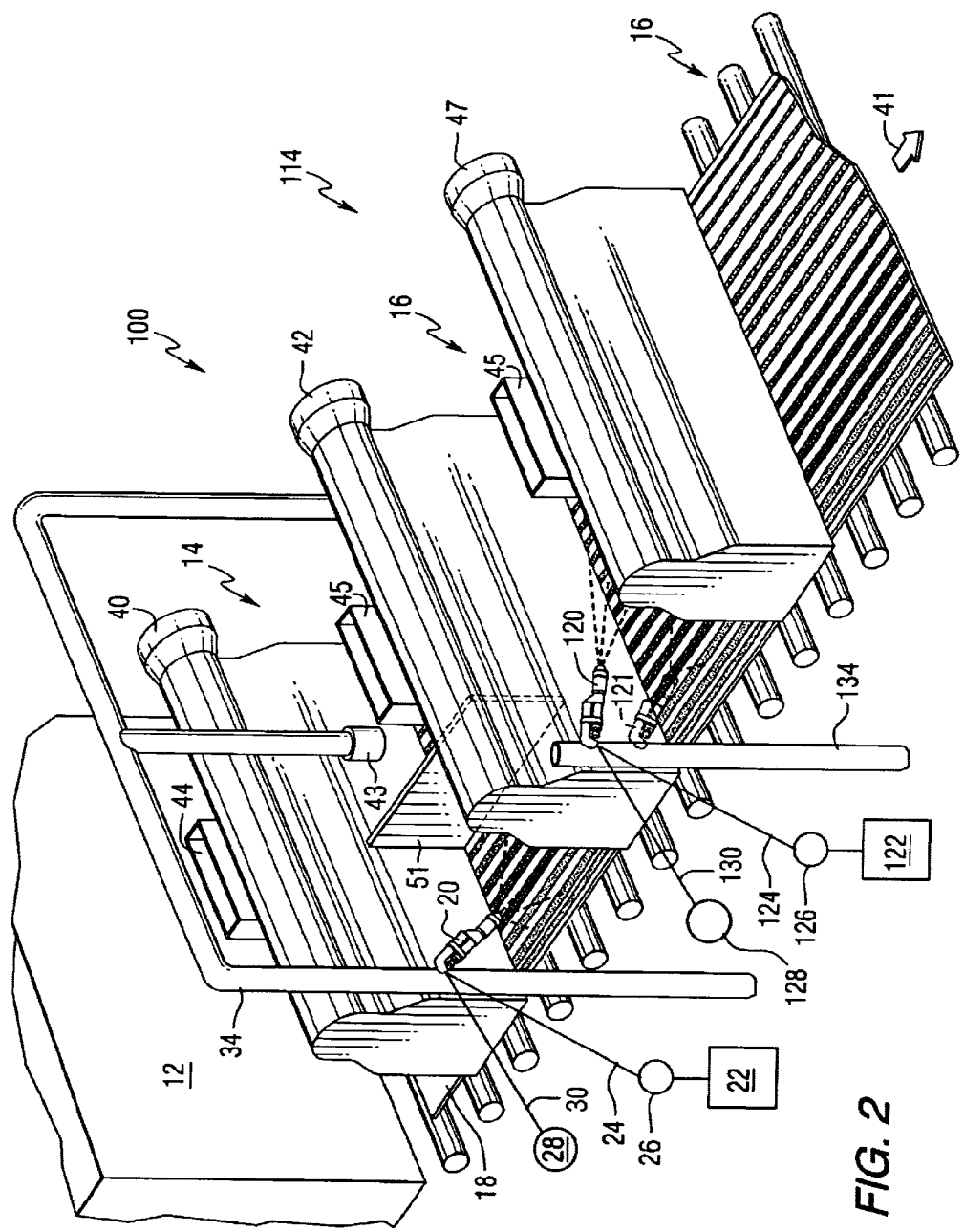
FIG. 2 is an isometric view of an alternative embodiment of the coating station of the invention.

With reference to FIG. 1, there is shown a coating apparatus 10 incorporating features of the invention. The coating apparatus 10 includes a coating station 14 for depositing a graded coating on a substrate. In FIGS. 1 and 2, the graded coating of the invention is represented by spaced lines of decreasing thickness. However, it is to be understood that this representation is symbolic only, and in actuality the coating of the invention has a non-banded, graded appearance. In the discussion of the invention, although not limiting thereto, a pyrolytic coating is deposited on a heated substrate. Therefore, in the following discussion, a heated chamber, e.g., furnace 12, and a conveyor 16 are utilized with the coating station 14. The conveyor 16 extends from the furnace 12 through the coating station 14 and is configured to transport a substrate 18, e.g., a piece of flat glass to be coated, from the furnace 12 through the coating station 14 at a selected speed. The conveyor 16 can be of any conventional type, such as a plurality of rotatable metal or ceramic rolls. As can be appreciated, the furnace 12 may be a flat glass forming chamber of the type known in the art where molten glass moves on a metal bath and formed to provide a flat glass ribbon. The conveyor 16 may be the conveyor moving the glass ribbon from the forming chamber to an annealing lehr of the type used in the art to anneal the flat glass ribbon.

The coating station 14 includes a coating dispenser 20, such as a conventional air-atomizing Binks-Sames Model 95 spray nozzle. The coating dispenser 20 is configured to spray an atomized liquid material in a fan or cone-shaped pattern toward a surface of the substrate 18 in the coating station 14. The coating dispenser 20 is in flow communication with a source 22 of coating material, preferably an aqueous suspension of one or more metal acetylacetonates or other conventional coating materials, by a flexible conduit 24. Suitable coating materials are disclosed, for example, in U.S. Pat. No. 4,719,127 to Greenberg, which disclosure is herein incorporated by reference. A metering pump 26, such as a conventional Cole-Parmer MasterFlex 07523-20 pump, is in flow communication with the conduit 24. The coating dispenser 20 is also in flow communication with a source 28 of compressed fluid, such as air, by a flexible conduit 30.

The coating dispenser 20 is preferably mounted for pivotal, lateral and vertical movement in any usual manner on a support 34, such as a metal frame. Preferably the coating dispenser 20 is mounted relative to the glass piece to be coated or the supporting surface of the conveyor 16 such that an angle α (shown only in FIG. 1) of between about 0–90°, preferably between about 20–40°, is formed between an imaginary axis or line L drawn through the center of the spray emitting from the nozzle or discharge end of the coating dispenser 20 and a vertical axis V extending substantially perpendicular to the supporting surface or the surface of the substrate 18 being coated. The coating dispenser 20 is also vertically and horizontally movable such that the height of the coating dispenser 20 above the conveyor 16 as well as the position of the dispenser 20 along the conveyor 16 and the lateral position of the coating dispenser 20 with respect to the conveyor 16 can be selectively fixed. While only one coating dispenser 20 is shown in FIG. 1, a plurality of such coating dispensers 20 can be located on the first support 34, for example, beside, over or under the first coating dispenser 20.

A first exhaust hood 40 is located upstream of the coating dispenser 20 with respect to direction of travel of the conveyor 16 as indicated by arrowed line designated by the numeral 41, and a second exhaust hood 42 is located downstream of the coating dispenser 20 with respect to direction of travel of the conveyor 16. Optionally and preferably, a temperature sensor 43, such as a conventional infrared thermometer, may be positioned above the conveyor 16 adjacent to the first exhaust hood 40 to sense the temperature of the substrate 18 for pyrolytic coating. Each exhaust hood 40 and 42 is in flow communication with a respective exhaust conduit 44 or 45. An auxiliary exhaust hood 49 may be located near the far side of the substrate 18 away from the coating dispenser 20 to provide additional exhaust capability. To avoid an unwanted overspray onto the glass surface, a barrier 51 shown in FIG. 2 may be provided and/or the hood 49 may be used. In this manner, the spray from the coating dispenser 20 is not contacted preventing interference with the spray while any randomly airborne coating material will be prevented from being carried and deposited on the portion of the glass forthwith from the coating dispenser 20.

With continued reference to FIG. 2 there is shown a coating apparatus 100 incorporating features of the invention. The coating apparatus 100 includes a second coating station 114 having a second coating dispenser 120 pivotally mounted on a second support 134. A third exhaust hood 47 is located downstream of the second exhaust hood 42. Although not shown in FIG. 2, auxiliary exhaust hood 49 as shown in FIG. 1 may also be located in the first and second coating stations 14 and 114 respectively. The second support 134 is laterally spaced from the first support 34 so that the second coating dispenser 120 is located between the second and third exhaust hoods 42 and 47. As shown in dashed lines in FIG. 2, additional coating dispensers 121 may be located at the second coating station 114, for example, beside, over or under the second coating dispenser 120. In both the apparatus 10 and 100, no shield or deflector is located between the spray from the coating dispensers and the object being coated.

The second coating dispenser 120 may be in flow communication with the source 28 of compressed fluid and the source 22 of coating material of the first coating dispenser 20 to spray the same coating material onto the substrate 18.

Alternatively, as shown in FIG. 2, the second coating dispenser 120 may be in flow communication with a separate source 128 of compressed fluid by a conduit 130 and a separate source 122 of coating material by a conduit 124 having a metering pump 126 to spray the same or a different coating onto the substrate 18. The additional coating dispenser 121 may similarly be in flow communication with the same or different sources of compressed fluid and coating material as the coating dispensers 20 and 120.

Operation of the coating station 14 will now be described with particular reference to the embodiment shown in FIG. 1. In the following discussion, the heating chamber or furnace 12 of FIG. 1 may be considered a chamber for a continuous piece of glass, e.g., a glass ribbon, or as a conventional furnace for individual glass pieces.

A continuous substrate, e.g., a glass ribbon, or discrete substrates 18 to be coated, such as pieces of flat glass, are heated to a desired temperature in the chamber (not shown) or the furnace 12, respectively. The conveyor 16 transports the heated substrates 18 into the coating station 14. The coating dispenser 20 is selectively positioned at a desired height and lateral position, i.e., distance from the side of the conveyor 16, and at an angle α such that when the substrate 18 is transported through the coating station 14, the coating dispenser 20 directs the coating material onto the upper surface of the substrate 18. This positioning of the coating dispenser 20 can be done either manually or automatically by a conventional automated positioning device attached to the coating dispenser 20.

As the substrate 18 moves through the coating station 14, coating material is moved from the coating material source 22 to the coating dispenser 20 and mixed with compressed air from the compressed fluid source 28 to exit the nozzle of the coating dispenser 20 as a cone-shaped spray pattern of coating material directed toward the hot substrate 18. The first and second exhaust hoods 40 and 42 exhaust excess coating material from the coating station 14 to provide an essentially defect or blemish free uniform coating. The auxiliary exhaust hood 49 may also be used to further enhance the exhaust from the coating station 14. As discussed above, to prevent coating particles in the air from moving over and depositing on the portion of the ribbon furthermost from the coating dispenser, a barrier 51 shown in FIG. 2 may be used. As the substrate 18 moves through the coating station 14, the coating dispenser 20 sprays the coating material onto the top of the hot substrate 18, where the coating material pyrolyzes to form a substantially durable graded pyrolytic coating.

The size of the spray fan as measured at the glass surface, the speed of the conveyor 16 and the distance between the nozzle of the coating dispenser 20 and the substrate 18 are fixed such that the spray pattern forms a desired coating distribution or grade on top of the substrate 18. Coating pressures and volumes through the coating dispenser 20 are selectively controlled to deposit a desired coating gradient and thickness on the surface of the substrate 18. Because the coating dispenser 20 is angled toward the far side of the substrate 18, a thicker layer of the coating material is deposited on the near side of the substrate 18, i.e., the side of the substrate closest to the coating dispenser 20, and the thickness of the coating material deposited on the substrate 18 decreases as the distance from the opposite edge of the substrate (the edge furthermost from the coating dispenser) decreases, with a substantially continuous thickness gradient occurring therebetween, i.e., as the distance from the coating dispenser 20 increases, the coating thickness decreases. Thus, a smooth, substantially continuously graded coating is applied across a desired width of the upper surface of the substrate 18. Since no shields or deflectors common in the prior art are required to practice the invention, the resulting coating forms a smooth, continuous gradient on the substrate 18 without the banding or mottling limitations common with prior art coating devices. Also, by using a pyrolytic coating material rather than the dyes common in the prior art, the resulting coated substrate of the invention can be directly utilized, e.g., as an automotive transparency, without the need for additional protective measures such as protective overcoats or lamination generally required for the dye coated substrates of the prior art.

As will be understood by one of ordinary skill in the art of coating glass, the coating system parameters may affect the resulting coating. For example, all else remaining equal, the faster the substrate 18 is moved through the coating station, the thinner will be the overall thickness of the coating. The larger the angle, the thinner will be the coating near the coating dispenser 20 and the thicker will be the coating farther away from the coating dispenser 20. As the distance of the coating dispenser 20 above the substrate 18 increases, the thinner will be the overall coating. The larger the flow rate of coating material through the coating dispenser 20, the thicker will be the overall coating.

EXAMPLE #1

Pieces or substrates of flat glass (commercially available from PPG Industries, Inc. of Pittsburgh, Pa., under the registered trademark SOLARBRONZE®) approximately 0.157 inch (4.0 mm) thick, 24 inches (60.1 cm) wide and 30 inches (76.2 cm) long were coated with the coating station of the invention shown in FIG. 1. The substrates were washed with a dilute detergent solution, rinsed with distilled water and then air dried. The cleaned glass substrates were heated in an electric horizontal roller hearth furnace with a furnace temperature of about 1150° F. (621° C.). The heated substrates were transported by the conveyor from the furnace through the coating station at a line speed of about 250 inches (635 cm) per minute. The temperature of the substrates entering the coating station was about 1135–1139° F. (613–615° C.), as measured by the infrared thermometer 43 positioned above the conveyor just upstream of the first exhaust hood 40. The coating material used was an aqueous suspension of a mixture of finely ground metal acetylacetonates mixed in water at 16.5 wt % and having a specific gravity of 1.025 measured at 72° F. (22° C.). The metal acetylacetonate mixture consisted of 95 wt % Co $(C_5H_7O_2)_3$ hereinafter referred to as "cobaltic acetylacetonate" and 5 wt % Fe $(C_5H_7O_2)_3$ hereinafter referred to as "ferric acetylacetonate". The aqueous suspension was placed in a container having an impeller type mixer operated at 352 rpm to maintain the suspension. The liquid suspension was delivered to the spray nozzle by a laboratory peristaltic metering pump (Cole-Parmer MasterFlex 07523-20) at a rate of 85 milliliters per minute. The spray nozzle was a conventional air-atomizing type (Binks-Sames model 95) and compressed air was utilized at a pressure of 50 lbs. per square inch, gauge (3.5 kg/sq. cm). The spray nozzle was laterally positioned about 7 inches (17.8 cm) from the near side of the substrate and was vertically positioned about 11 inches (27.9 cm) above the surface of the glass substrate to be coated. The spray nozzle was angled such that a centerline of the nozzle intersected the top of the substrate at an angle α of about 25°. This arrangement produced a graduated, substantially bronze colored fade zone on the glass substrate.

As shown in FIG. 2, a number of coating stations 14, 114 may be located in series to apply the same or a different coating material onto the substrate 18 at each coating station 14, 114. For example, it may be desirable to create a layered or stacked coating or to create a selected color on the substrate or to form multiple colors on the same substrate.

Although the above discussion focused on the practice of the invention with a coating device utilizing conventional air atomizing spray nozzles, the invention is not limited to such coating devices but may be practiced with other types of coating devices and processes, e.g., coaters for vapor depositing a coating ("CVD coaters"), combustion CVD coaters, sputter coatings using cathodes of single or multiple components e.g. copper and manganese or sol-gel coatings.

Figure 3:
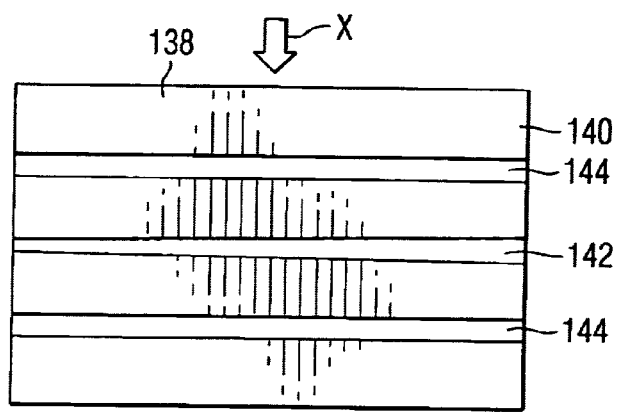
FIG. 3 is a bottom view of a CVD coater incorporating the teachings of the invention.

As will be appreciated by one of ordinary skill in the CVD coating art, CVD coaters are usually located above a moving substrate. The coating block includes delivery slots through which coating material is discharged and one or more exhaust slots positioned transversely to a direction of movement of the substrate. A bottom 138 of a CVD type coating block 140 incorporating the principles of the present invention is shown in FIG. 3. The CVD coating block 140 has at least one tapered coating delivery slot 142, tapering from a narrower width at one end to a wider width at the other end, through which a coating material may be directed in conventional manner toward the surface of a substrate moving in the direction of arrow X under the coating block 140. Exhaust slots 144 are located on each side of the delivery slot 142. The exhaust slots 144 may be of uniform width as shown in FIG. 3 or may be tapered, e.g., in similar manner to the delivery slot 142. Alternatively, the delivery slot 142 may be of uniform width and the exhaust slots 144 tapered. A thicker coating will be applied to the substrate surface under the narrower portion of the delivery slot 142 than under the wider portion of the delivery slot 142, with a graded coating thickness being deposited therebetween.

Figure 4:
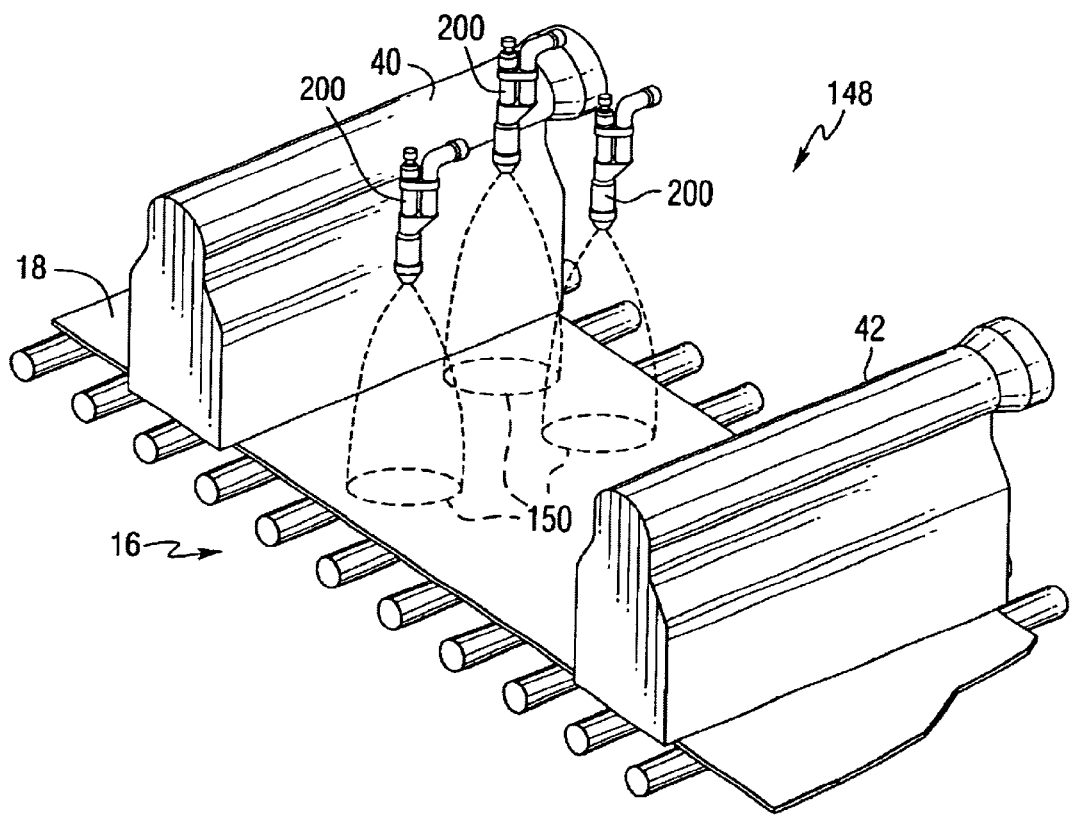
FIG. 4 is a perspective view of an additional coating apparatus embodiment of the invention.

FIG. 4 shows a further embodiment of a coating station 148 of the invention. The coating station 148 has a first exhaust hood 40 spaced from a second exhaust hood 42 with a plurality of staggered, spaced apart coating dispensers 200, e.g., conventional air atomizing spray nozzles, located therebetween. In the embodiment shown in FIG. 4 but not to be considered as limiting to the invention, three such coating dispensers 200 are shown. The coating dispensers 200 are preferably movably or pivotally mounted on a stationary frame above a conveyor 16 used to transport a substrate 18 to be coated into the coating station 148. Of course, the coating dispensers 200 could alternatively be mounted on a movable frame or gantry to move the coating dispensers 200 relative to the substrate 18. The coating dispensers 200 are in flow communication with one or more sources of coating material and/or pressurized fluid.

Figure 5:
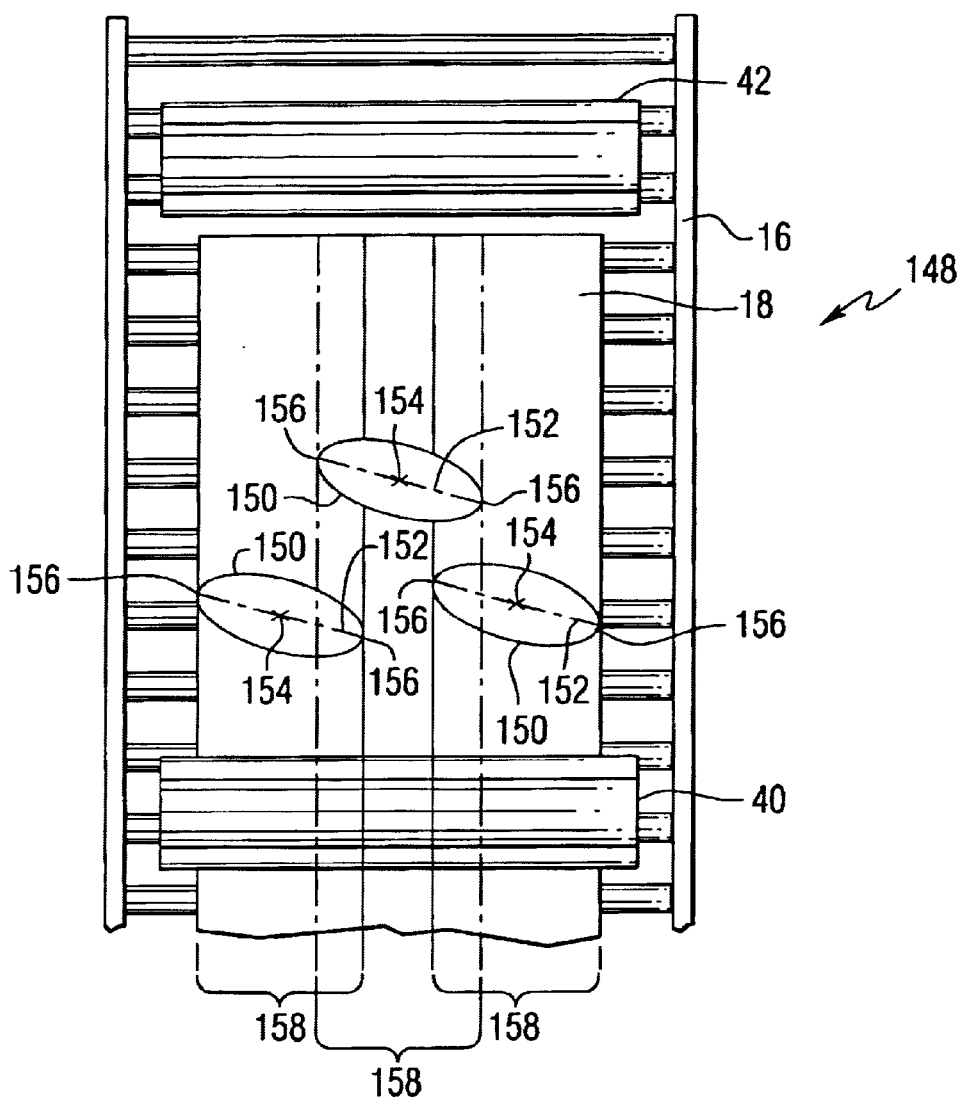
FIG. 5 is a plan view of a coating pattern formed by the apparatus shown in FIG. 4.
Figure 6:
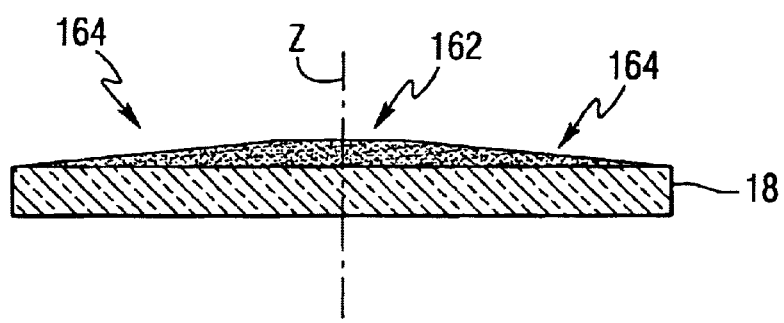
FIG. 6 is an end sectional view of a substrate coated by the coating apparatus of FIG. 4.

As shown in FIG. 4, the coating dispensers 200 are preferably directed downwardly toward the substrate 18 to form spray patterns, such as elliptical or elongated spray patterns 150, on the substrate 18. As shown in FIG. 5, each elongated pattern 150 has a major axis 152 with a center 154 and an outer periphery or edge 156. The coating dispensers 200 are arranged so that the spray pattern from one coating dispenser 200 does not interfere with the spray pattern from another coating dispenser 200. For example, the coating dispensers 200 may be arranged in a staggered formation such that the major axes 152 are all substantially parallel and are spaced apart. As shown in FIG. 5, each coating dispenser 200 forms a coated area 158 on the substrate 18 as the substrate 18 moves through the coating station 148. The coating dispensers 200 are preferably positioned such that the coated area 158 formed by one coating dispenser 20 does not extend beyond the pattern center 154 of an adjacent coating dispenser 200. Thus, the coated areas 158 overlap to form a coating as shown in FIG. 6 as having a substantially uniformly thick center region 162 with tapered or graded side regions 164 located at each side of the coating. If desired, the coated substrate 18 may be cut into two or more pieces. For example, the substrate 18 may be cut in half along a central vertical axis to form two separate coated pieces, with each piece having a graded side region 164 or the piece 18 may be cut into three pieces with the center piece having a uniform coating and the outer pieces having the graded region.

While in the embodiment discussed above coating dispensers 200 forming elliptical coating patterns were discussed, the invention is not limited to such elliptically shaped coating patterns. The coating patterns may, for example, be of any shape, e.g., circular, oval, etc. Additionally, a plurality of such coating stations 148 may be positioned in series to spray the same or different coating materials onto the substrate.

Specific coating compositions and methods to achieve coatings of selected transmitted color will now be described. These compositions and methods are generally grouped in accordance with the color produced for ease of discussion. However, the particular groupings should not be considered as limiting to the invention.

Copper-Manganese Oxide Coatings

Coatings, particularly pyrolytically deposited coatings, formed using a suspension having copper containing and manganese containing components are found to provide excellent coatings ranging in transmitted color from amber or light brown to blue-gray to blue, depending upon the molar ratio of copper to manganese in the applied suspensions. Specifically, aqueous suspensions containing a mixture of manganese containing acetylacetonates (e.g., $Mn(C_5H_7O_2)_2$ hereinafter referred to as "manganous acetylacetonates" or $Mn(C_5H_7O_2)_3$ also referred to as "manganic acetylacetonate") and copper containing acetylacetonates (e.g. $Cu(C_5H_7O_2)_2$ also referred to as "cupric acetylacetonate") have been found to produce coatings ranging in transmitted color from a light brown with high copper content or an amber color with high manganese content to a blue color as the copper to manganese molar ratio in the coating is one and to a blue-gray color as the molar ratio is slightly greater or less than 1. Changes in colors as the copper to manganese molar ratio increases or decrease are listed in Table I and are discussed below in more detail.

Coated substrates were formed by hand spraying aqueous suspensions of mixed copper and manganese containing acetylacetonates, such as cupric and manganous acetylacetonates, onto clear float glass substrates cut into 4 inch×4 inch (10.2 cm×10.2 cm) squares. The substrates were washed with a dilute detergent solution, rinsed with distilled water and then air dried. An aqueous suspension of cupric acetylacetonate $Cu(C_5H_7O_2)_2$ and manganous acetylacetonate $Mn(C_5H_7O_2)_2$ was produced by a conventional wet grinding technique and the copper and manganese containing acetylacetonates were mixed in the desired proportions with deionized water and a chemical wetting agent to disperse, deaerate and suspend the metal acetylacetonate particles. The substrates were heated in a conventional bench top muffle furnace to a temperature sufficient to ensure pyrolysis of the applied suspensions, e.g., about 600° C. and then hand sprayed with a Binks model 95 spray gun equipped with a gravity feed reservoir.

The range of transmitted and reflected color of the coated substrate, as a function of composition, are shown in Table I. The reflected and transmitted colors of the coated substrate are set forth in conventional manner using the standard chromaticity coordinates Y,x,y, for illuminant A, 2° observer established by the Commission Internationale de l'Eclairage (CIE). The coated substrates were analyzed using X-ray diffraction. Samples A6 to A8 of Table I were found to contain as a majority phase a cubic $Cu_{1.4}Mn_{1.6}O_4$ spinel-type phase occurring generally in the range of 0.8 to 1.1 Cu/Mn molar ratio in the coating as determined by X-ray Fluorescence ("XRF"), see Table I. The Cu rich coatings of Samples A1 and A2 were brown colored in transmission, and the Mn rich colored coatings were amber colored in transmission as in Samples A13 and A14.

TABLE I

Reflectance and Transmittance CIE Chromaticity Coordinates for CuMn Oxide Films on Clear Glass

| Sample | Cu(II)/Mn(II) Molar Ratio in Suspension | Cu/Mn Molar Ratio in Film (XRF) | * (ill.A, 2°) | | | ** (ill.A, 2°) | | | *** (ill.A, 2°) | | |
|---|---|---|---|---|---|---|---|---|---|---|---|
| | | | Y | x | y | Y | x | y | Y | x | y |
| A1 | Cu Only | Cu Only | 23.81 | 0.4350 | 0.4084 | 17.41 | 0.4419 | 0.4131 | 57.13 | 0.4679 | 0.4139 |
| A2 | 9.00 | 20.57 | 26.27 | 0.4389 | 0.4092 | 19.61 | 0.4400 | 0.4122 | 52.71 | 0.4676 | 0.4135 |
| A3 | 4.00 | 5.48 | 19.06 | 0.4338 | 0.4047 | 11.38 | 0.4347 | 0.4072 | 58.87 | 0.4576 | 0.4131 |
| A4 | 2.03 | 2.42 | 26.92 | 0.4517 | 0.4047 | 12.04 | 0.4312 | 0.3945 | 37.26 | 0.4399 | 0.4115 |
| A5 | 1.50 | 1.75 | 24.87 | 0.4610 | 0.4044 | 10.83 | 0.4460 | 0.3937 | 35.78 | 0.4290 | 0.4090 |
| A6 | 1.00 | 1.10 | 28.22 | 0.4778 | 0.4075 | 13.61 | 0.4769 | 0.4009 | 27.46 | 0.4065 | 0.4029 |
| A7 | 0.82 | 0.91 | 24.56 | 0.4734 | 0.4057 | 9.82 | 0.4722 | 0.3960 | 34.78 | 0.4149 | 0.4058 |
| A8 | 0.67 | 0.79 | 28.52 | 0.4734 | 0.4067 | 13.09 | 0.4698 | 0.3978 | 27.85 | 0.4107 | 0.4039 |
| A9 | 0.54 | 0.86 | 23.97 | 0.4597 | 0.4027 | 9.71 | 0.4432 | 0.3887 | 38.16 | 0.4266 | 0.4083 |
| A10 | 0.49 | 0.61 | 27.00 | 0.4641 | 0.4036 | 12.74 | 0.4500 | 0.3932 | 31.37 | 0.4213 | 0.4075 |
| A11 | 0.33 | 0.38 | 27.07 | 0.4452 | 0.4021 | 13.88 | 0.4203 | 0.3915 | 40.13 | 0.4389 | 0.4109 |
| A12 | 0.25 | 0.28 | 24.90 | 0.4355 | 0.4009 | 15.14 | 0.4146 | 0.3950 | 49.09 | 0.4478 | 0.4125 |
| A13 | 0.11 | 0.12 | 25.23 | 0.4235 | 0.4019 | 20.52 | 0.4177 | 0.4045 | 61.80 | 0.4600 | 0.4147 |
| A14 | Mn Only | Mn Only | 31.17 | 0.4294 | 0.4076 | 28.89 | 0.4266 | 0.4114 | 61.68 | 0.4650 | 0.4150 |

*Film side reflected chromaticity values of as deposited film.
**Reflected chromaticity value of side opposite as deposited film side.
***Transmitted chromaticity value of as deposited film on glass.

EXAMPLE #2

In this example, substrates were prepared and coated as follows. Four millimeter thick float glass substrates, 4 inch×4 inch (10.2 cm×10.2 cm) squares, were cleaned by passing the substrates through a dilute detergent solution, rinsing the substrates with distilled water and then air drying the substrates. The cleaned glass substrates were sprayed with a 50/50 volume percent solution of two-propanol and distilled water, and wiped dry with a cellulose-polyester cloth to remove dirt, unwanted film, fingerprints and/or debris. Aqueous suspensions of cupric acetylacetonate and manganic acetylacetonate were provided by conventional wet grinding techniques. These single metal acetylacetonate suspensions were mixed together to create binary suspensions with Cu/Mn molar ratios in the range of 9.09 to 0.43. The glass substrates were transferred into a bench top muffle furnace and heated to a temperature of about 600° C. The heated substrates were hand sprayed with a spray gun equipped with a gravity feed reservoir to apply the aqueous suspension onto the substrate. The spray gun used in the experiment included a Binks model 63 PB aircap, a Binks model 63 SS fluid nozzle and a Binks model 663 needle. The atomizing air pressure of the gun was set at 50 PSI. The aqueous suspension was sprayed onto the substrate for about 8 seconds at a distance of about 10 inches (25.4 centimeters) from the glass surface.

As shown in Table II, films having a higher Cu/Mn mole ratio equal to or greater than about 15.13 produced coated substrates having a brown color in transmittance. As the Cu/Mn mole ratio as determined by XRF in the film decreased, the transmitted color changed from light brown to grayish blue to deep blue to a lighter blue for Sample Nos. B1–B9 of Table II. The deep blue-colored coatings of Sample Nos. B6–B8 of Table II in transmission were determined by XRF analysis to contain a majority of a cubic $Cu_{1.4}Mn_{1.6}O_4$ spinel-type phase and generally occurred in the range of 0.8 to 1.2 Cu/Mn molar ratio in the film, as determined by XRF. After deposition, the coated substrates were heated to 650° C. for about ten minutes. This heating caused a change in percent luminous transmittance (ΔY) and in color which is shown in Table II as ΔE (FMCII). For ease of discussion, an increase in transmitance which occurs after heat treatment will be referred to herein as "bleaching". ΔE (FMCII) in Table II is defined as the difference in color of the coated substrate before and after heating. ΔE (FMCII) is determined in accordance with the conventional formula established by the Colorimetry Committee of the CIE.

It should be noted that the blue-colored spinel-type phase of $Cu_{1.4}Mn_{1.6}O_4$ can be produced by using a Cu(II)/Mn(II) acetylacetonate suspension as in Sample Nos. A6–A8 in Table I. The same spinel-type phase is observed for the Cu(II)/Mn(III) acetylacetonate suspension used for samples B6–B8 in Table II. Although Table I does not show the results after heat treatment of Sample Nos. A6–A8, it is expected that these samples bleach in a similar manner as Sample Nos. B6–B8 in Table II.

TABLE II

| Sample No. | Cu(II)/Mn(III) Suspension Mole Ratio | Cu/Mn Mole Ratio in Deposited Films (XRF) | Transmitted chromaticity value for as deposited film Ill. A, 2° | | | Change in transmitted chromaticity value after heat treatment at 650° C., 10 mins. Ill. A, 2° | | | ΔE (FMCII) |
|---|---|---|---|---|---|---|---|---|---|
| | | | Y | x | y | ΔY | Δx | Δy | |
| B1 | 9.09 | 15.13 | 50.59 | 0.4713 | 0.4135 | 2.56 | −0.0049 | 0.0001 | 6.56 |
| B2 | 4.00 | 5.93 | 47.98 | 0.4644 | 0.4138 | 2.95 | −0.0111 | −0.0009 | 12.81 |

TABLE II-continued

| Sample No. | Cu(II)/ Mn(III) Suspension Mole Ratio | Cu/Mn Mole Ratio in Deposited Films (XRF) | Transmitted chromaticity value for as deposited film Ill. A, 2° | | | Change in transmitted chromaticity value after heat treatment at 650° C., 10 mins. Ill. A, 2° | | | |
|---|---|---|---|---|---|---|---|---|---|
| | | | Y | x | y | $\Delta Y$ | $\Delta x$ | $\Delta y$ | $\Delta E$ (FMCII) |
| B3 | 2.33 | 3.31 | 38.66 | 0.4538 | 0.4135 | 1.90 | −0.0130 | −0.0020 | 13.13 |
| B4 | 1.49 | 2.11 | 38.56 | 0.4417 | 0.4188 | 2.14 | −0.0123 | −0.0020 | 12.48 |
| B5 | 1.00 | 1.41 | 37.15 | 0.4288 | 0.4089 | 6.42 | −0.0058 | −0.0016 | 13.33 |
| B6 | 0.82 | 1.15 | 31.57 | 0.4164 | 0.4058 | 7.07 | 0.0041 | 0.0012 | 15.54 |
| B7 | 0.67 | 0.94 | 29.57 | 0.4112 | 0.4043 | 7.10 | 0.0103 | 0.0029 | 19.19 |
| B8 | 0.54 | 0.78 | 23.55 | 0.4044 | 0.4009 | 8.13 | 0.0167 | 0.0059 | 27.14 |
| B9 | 0.43 | 0.60 | 39.38 | 0.4266 | 0.4082 | 6.88 | 0.0100 | 0.0027 | 16.61 |

Diffusion Couple Experiments

In a Cu—Mn system, copper is the more mobile species. This determination was formed based on the following experiments. A CuO film was sprayed onto the surface of a first heated quartz substrate. In the following discussion, the substrates were about 600° C. when coated. A $Mn_3O_4$ film was sprayed onto the surface of a second heated quartz substrate. The two substrates were then coupled face to face with portions of the coated surfaces in contact with one another and the remaining portion of the coated surface spaced from one another, i.e., the portions of the coated surface were out of contact with one another. The substrates were heated to 650° C. for 16.2 hours. Upon separation, a portion of the coated surface of the second substrate in direct contact with the CuO film of the coated surface of the first substrate showed a dark blue color as viewed with the unaided eye. This is believed to be due to Cu ions migrating from the CuO film into the $Mn_3O_4$ film to form a dark blue colored coating of $Cu_{1.4}Mn_{1.6}O_4$ spinel-type phase. The corresponding area of the CuO film was much lighter upon heating, indicating a depletion of Cu ions. The portion of the $Mn_3O_4$ film on the second substrate not in contact with the CuO film converted upon heating from amber to a mauve/lavender colored $Mn_2O_3$ film.

In a further experiment, a CuO film was deposited on a heated quartz substrate and an $Mn_3O_4$ film was deposited on a heated glass substrate. The two substrates were then coupled face-to-face with portions of the coated surfaces in contact with one another and the remaining portions out of contact with one another. The substrates were heated to 650° C. for 30 minutes. Upon separation, portion of the coated surface of the second substrate in direct contact with the CuO film of the coated surface of the first substrate showed a dark blue color in transmission as viewed with the unaided eye. This is believed to be due to the migration of copper ions from the copper oxide (CuO) film to the $Mn_3O_4$ film to form the dark blue colored $Cu_{1.4}Mn_{1.6}O_4$ spinel-type phase. The corresponding film area on the quartz substrate was very light, indicating a depletion of Cu ions. The remaining areas of the films were little changed, indicating that the Cu ions do not easily diffuse into quartz but preferentially diffuse into the $Mn_3O_4$ film deposited on the glass substrate to form the dark blue-colored $Cu_{1.4}Mn_{1.6}O_4$ spinel-type phase. This also indicates that Mn ions do not preferentially diffuse into glass or that they diffuse much more slowly than Cu ions.

A CuO film was deposited on a heated glass substrate and a $Mn_3O_4$ film was deposited on a heated quartz substrate. The two substrates were then coupled face to face and heated to 650° C. for 30 minutes. Upon separation, the surfaces of the amber colored $Mn_3O_4$ film on quartz out of contact with the copper oxide film on the glass converted to a lavender colored $Mn_2O_3$ film. A small portion of the quartz substrate showed a blue colored area, indicating the presence of the dark blue colored $Cu_{1.4}Mn_{1.6}O_4$ spinel-type phase. However, most of the Cu diffused into the glass rather than towards the $Mn_3O_4$ film deposited on quartz. Thus, from these experiments, it was concluded that Cu ions are the more mobile species in the $CuMnO_x$ system and is the main species that must be prevented from diffusing into the glass substrate.

Prevention of Bleaching

As discussed with respect to Example #2 above, as-deposited thin films on glass substrates tend to change color after subsequent heat treatment, such as tempering or annealing. This is believed to be due to the ion exchange of mobile species between the coating layer and the glass substrate. It is known to place inert layer(s) between the glass substrate and the coating to act as a barrier layer to help prevent such diffusion. However, these barrier layers are not always effective. Therefore, an alternative method of stopping or slowing down such diffusion by the use of a concentration gradient layer located between the coating layer and the substrate has been developed. This concept may be generally explained as follows:

If a single layer oxide coating, represented for example as $ABCO_x$ for purposes of discussion where A, B and C are metal ions in the coating layer, is known to change color, i.e., bleach after heat treatment, due to B ions, for example, diffusing into the glass substrate in exchange for D ions, for example alkali ions, coming out of the glass substrate, a thin film of $BO_x$ may be deposited between the glass substrate and the $ABCO_x$ coating. As can be appreciated, the invention may be practiced with a single layer oxide coating having two or more metal ions. The $BO_x$ layer provides a sacrificial or concentration gradient layer to prevent such bleaching. B ions from this sacrificial layer diffuse into the glass more readily than the B ions from the $ABCO_x$ coating layer. Thus, by placing a $BO_x$ layer between the $ABCO_x$ layer and the glass, the B ions in the $BO_x$ undercoat layer partially or fully diffuse into the glass. The $BO_x$ layer acts as a concentration gradient deterrent layer to prevent or slow down B ions from the top coating layer or the $ABCO_x$ coating layer from diffusing into the glass substrate. Consequently, B ions in the top coat $ABCO_x$ layer diffuse more slowly into the undercoat $BO_x$ layer, if at all, and thus minimize the degradation of the $ABCO_x$ layer while B ions from the $BO_x$ undercoat layer diffuse mostly into the glass and perhaps slightly into the top coat layer. The transmitted color of the coated glass can thus be controlled by the thickness and composition of the $BO_x$ layer, as well as the thickness and composition of the top coat layer $ABCO_x$. This results from the fact that as a function of time, temperature and film thickness, most or all of the $BO_x$ layer can be broken down such that substantially only the desired $ABCO_x$ top coat layer is left behind. The $BO_x$ layer is preferably deposited directly on the glass substrate but may also be deposited on another coating layer deposited on the substrate.

For purposes of acting as a concentration gradient deterrent layer, the $BO_x$ layer should be deposited to both minimize a color change in the coated glass and also to minimize the diffusion of B ions away from the top coat layer into the glass. For example, the above-described $Cu_{1.4}Mn_{1.6}O_4$ blue colored films may bleach upon heat treatment resulting in breakdown of the crystal structure of the chromophore to the point where the color may no longer be present (for example, heating at 650° C. for 16 hours) and the Cu and Mn ions have diffused into the glass. As was discussed above, copper is the most mobile species in this system. Therefore, a two layer system was made comprising glass/CuO/$Cu_{1.4}Mn_{1.6}O_4$.

Experimental results for the deposition of a CuO layer of varying thickness are shown in Table III below. The coatings were deposited on heated pieces of float glass on the side of the glass unsupported on the tin bath during manufacture. The unsupported surface was coated to emulate what is currently done on line for pyrolytically or CVD coating on a float ribbon. The tin rich surface of the piece of glass cut from the float ribbon can be coated during laboratory experiments. However, it has been determined that the tin rich surface of the glass acts as a barrier to diffusion of ions from a coating into the glass during heat treatment and that the tin ions act as a barrier. The CuO layer was deposited on the glass followed by depositing the $Cu_{1.4}Mn_{1.6}O_4$ layer on the CuO layer. The thickness of the CuO layer was varied by varying the spray time for applying the copper acetylacetonate suspension onto the glass substrate, i.e., a two second spray time yields a thinner resultant CuO layer than an eight second spray time. The thicknesses of the CuO layers range from about 50 Å for a two second spray time to about 200 Å for an eight second spray time. As can be appreciated the invention is not limited to the thickness of the copper oxide layer and thicknesses in the range of 25 Angstroms(Å)-260 Å are acceptable in the practice of the invention. The thickness of the $Cu_{1.4}Mn_{1.6}O_4$ layers was not varied and had a thickness of about 300 Å. The $Cu_{1.4}Mn_{1.6}O_{1.4}$ film was deposited by spraying copper (II) and manganese (III) acetylacetonates in the molar ratio of 0.54 for 8 seconds to deposit a layer having a thickness of about 300 Å. As can be appreciated, the invention is not limited to the thicknesses of the $Cu_{1.4}Mn_{1.6}O_{1.4}$ films and thicknesses in the range of 100 Å-700 Å are acceptable. The thicknesses of the films of the Samples were determined by spectroscopic ellipsometry.

The bleaching effect is clearly noted for coatings deposited on glass, e.g. glass made by the float process; however, for coatings deposited on quartz, the bleaching effect is not as pronounced as for glass substrates because there is little to no ion exchange between the quartz substrate and coating because the quartz substrate has ions present in the parts per million thereby reducing ion exchange.

TABLE III

The effect of varying the CuO layer thickness of Clear Glass/CuO/$Cu_{1.4}Mn_{1.6}O_4$ samples before and after heat treatment at 650° C. for 10 minutes. The $Cu_{1.4}Mn_{1.6}O_4$ films were deposited with an 8 second spray time with a Cu(II)/Mn(III) molar ratio of 0.54 in the suspension.

| Sample No. | Spray Time (seconds) CuO/$Cu_{1.4}Mn_{1.6}O_4$ | | Transmitted chromaticity values for as deposited film ill.A, 2° | | | Change in transmitted chromaticity values after heat treatment at 650° C., 10 min. ill.A, 2° | | |
|---|---|---|---|---|---|---|---|---|
| | | | Y | x | y | ΔY | Δx | Δy |
| D1 | 2/8 | before heat treat | 47.20 | 0.4271 | 0.4086 | | | |
| | | after heat treat | 53.03 | 0.4317 | 0.4092 | 5.83 | 0.0046 | 0.0006 |
| D2 | 3/8 | before heat treat | 42.97 | 0.4279 | 0.4088 | | | |
| | | after heat treat | 44.78 | 0.4245 | 0.4076 | 1.81 | −0.0034 | −0.0012 |
| D3 | 4/8 | before heat treat | 40.09 | 0.4328 | 0.4099 | | | |
| | | after heat treat | 40.83 | 0.4273 | 0.4085 | 0.74 | −0.0055 | −0.0014 |
| D3 | 6/8 | before heat treat | 33.01 | 0.4333 | 0.4111 | | | |
| | | after heat treat | 33.55 | 0.4280 | 0.4096 | 0.54 | −0.0052 | −0.0015 |
| D4 | 8/8 | before heat treat | 34.03 | 0.4444 | 0.4126 | | | |
| | | after heat treat | 34.72 | 0.4408 | 0.4119 | 0.69 | −0.0036 | −0.0008 |

The two layer system (glass/CuO/$Cu_{1.4}Mn_{1.6}O_4$) did not give the typical blue color associated with a $Cu_{1.4}Mn_{1.6}O_4$ spinel-type phase due to the presence of the light brown colored CuO bottom layer. The two layer system was heat treated for 10 minutes at 650° C. and compared with a single layer as-deposited and unheated sample having a $Cu_{1.4}Mn_{1.6}O_4$ spinel-type phase coating. Results of varying the Cu/Mn molar ratio from 0.82 to 1.49 in the top coat with the same CuO bottom layer (the layer close to the glass) and comparing the as-deposited two layer system with the same heat treated two layer systems are shown on Table IV. After heating each of the two layer systems, the transmitted color was again blue due to the diffusion of Cu ions from the concentration gradient deterrent CuO layer in the glass, leaving behind a desired $Cu_{1.4}Mn_{1.6}O_4$ blue colored spinel-type top layer. The change in transmittance (bleaching), ΔY, before and after heat treatment with a two layer system was reduced from 11% to 0.75% for a Cu/Mn ratio of 0.82 and from 6.4% to 0.26% for a Cu/Mn ratio of 1.00 and from 3.4% to −0.32% (darkened after heat treatment) for a Cu/Mn ratio of 1.49. Additionally, the ΔE (FMCII) (the color change in Mac Adam Units for the above-mentioned three samples)

decreased from 18.1 to 3.4, 17.8 to 3.7 and 15.1 to 4.9 respectively as a result of the presence of the CuO layer on the supported surface of the glass.

TABLE IV

| Sample No. | Film Deposited on Glass Unheated and Heated (htd) | Cu(II)/ Mn(III) Suspension Mole Ratio | Suspension of Acetylacetonate (Ac Ac") Spray Time in sec. | | Transmitted chromaticity values for as deposited film ill.A, 2° | | | Change in transmitted chromaticity values after heat treatment at 650° C., 10 min. ill.A, 2° | | | ΔE (FMCII) |
|---|---|---|---|---|---|---|---|---|---|---|---|
| | | | Cu(II) Ac Ac | Cu(II Ac Ac-Mn(III) Ac Ac | Y | x | y | Δ Y | Δ x | Δ y | |
| E1 | CuMnOx | 0.82 | 0 | 8 | 45.77 | 0.4327 | 0.4095 | | | | |
| E2 | CuMnOx (htd) | | | | 56.78 | 0.4345 | 0.4091 | 11.01 | 0.0018 | −0.0004 | 18.08 |
| E3 | CuO/CuMnOx | 0.82 | 8 | 8 | 38.08 | 0.4505 | 0.4131 | | | | |
| E4 | CuO/CuMnOx (htd) | | | | 38.83 | 0.4472 | 0.4127 | 0.75 | −0.0034 | −0.0004 | 3.42 |
| E5 | CuMnOx | 1.00 | 0 | 8 | 40.93 | 0.4397 | 0.4112 | | | | |
| E6 | CuMnOx (htd) | | | | 47.32 | 0.4267 | 0.4079 | 6.39 | −0.0130 | −0.0033 | 17.76 |
| E7 | CuO/CuMnOx | 1.00 | 8 | 8 | 32.61 | 0.4524 | 0.4133 | | | | |
| E8 | CuO/CuMnOx (htd) | | | | 32.87 | 0.4482 | 0.4126 | 0.26 | −0.0042 | −0.0007 | 3.67 |
| E9 | CuMnOx | 1.5 | 0 | 8 | 37.34 | 0.4449 | 0.4123 | | | | |
| E10 | CuMnOx (htd) | | | | 40.82 | 0.4310 | 0.4091 | 3.48 | −0.0139 | −0.0033 | 15.08 |
| E11 | CuO/CuMnOx | 1.5 | 8 | 8 | 31.31 | 0.4524 | 0.4136 | | | | |
| E12 | CuO/CuMnOx (htd) | | | | 30.99 | 0.4467 | 0.4125 | −0.32 | −0.0057 | −0.0011 | 4.89 |

The addition of other metal containing components, such as transition metal containing acetylacetonates, modifies the reflected and transmitted properties of the coating to alter the color and absorption of the coating. For example, MnCuCr oxide films tend to be neutral gray.

While in the above-described examples the copper containing acetylacetonates and manganese containing acetylacetonates were sprayed onto the heated substrate as a mixture, individual acetylacetonate suspensions may be sprayed sequentially onto a heated substrate to achieve the same desired color. For example, a suspension of a copper containing material, such as cupric acetylacetonate, can be sprayed onto a heated glass substrate, the substrate cooled and reheated and then sprayed with a manganese containing material, such as manganous or manganic acetylacetonate, to produce the desired, for example blue, color of the Cu—Mn chromophore described above utilizing, for example, the coating device shown in FIG. 2. Manganous or manganic acetylacetonate may be first sprayed onto the substrate, followed by a separate coating of cupric acetylacetonate. Again, regardless of the sequence of deposition, the desired color is achieved. Further, as can be appreciated, the temperature of the substrate during coating is not limited to the invention and any temperature at which pyrolysis coating occurs is acceptable, e.g. 400° C. and 900° C. Further as can be appreciated a binary or tertiary metal acetylacetonate may also be used to deposit the films e.g. $A_xB_y(C_5H_7O_2)_l$ where A or B are any metal ions e.g. copper or manganese and x,y and l are the number of moles to balance the equation for the desired binary acetylacetonate compound.

While the manganous or manganic and cupric acetylacetonate systems described above were successful in producing blue chromophores, the resulting blue coatings had relatively poor acid resistance.

The following experiment was conducted to find mole ratios of a copper/manganese system to give a desired color with durability. Substrates were cleaned as previously discussed for the substrates of Example #1. The coating material was a mixture of finely ground manganic, cupric and cobaltic acetylacetonates. The ground materials were suspended in an aqueous suspension; the suspensions having the starting compositions are listed on Table V. The results of eight samples are shown in Table V for different Cu(II)/Mn(III) mole ratios in suspension. The compositions of the starting mixture and the resulting films were analyzed by D.C. plasma analysis. The films which were blue-gray color in transmittance were found to have a Cu/Mn molar ratio in the range of about one. The other compositions were amber in appearance. The right column of Table V gives the results of the coating tested in accordance with a conventional ASTM 282-67 test (STANDARD TEST METHOD FOR ACID RESISTANCE OF ENAMEL, CITRIC ACID SPOT TEST). A "yes" indicates acceptable durability.

TABLE V

| Sample No. | Starting Composition % (DCP) Mn | Cu | Co | CuII/MnIII Suspension Mole Ratio | Film Cu/Mn Mole Ratio | Transmitted Color | Citric Acid Durability |
|---|---|---|---|---|---|---|---|
| C1 | 34.7 | 31.7 | 33.6 | 0.79 | 0.95 | Blue-gray | No |
| C2 | 55.3 | 11.9 | 32.8 | 0.19 | 0.25 | Amber | No |
| C3 | 55.2 | 31.4 | 13.5 | 0.49 | 0.62 | Amber | No |
| C4 | 26.8 | 24.1 | 49.1 | 0.78 | 1.09 | Blue-gray | Yes |
| C5 | 44.6 | 30.5 | 24.9 | 0.59 | 0.76 | Amber | No |
| C6 | 22.8 | 20.9 | 56.3 | 0.79 | 1.25 | Blue-gray | Yes |
| C7 | 26.8 | 17.8 | 55.4 | 0.57 | 0.88 | Blue-gray | Yes |
| C8 | 36.2 | 9.6 | 54.2 | 0.23 | 0.32 | Amber | Yes |

As can now be appreciated, adding cobaltic acetylacetonate $Co(C_5H_7O_2)_3$ to a manganese and copper containing acetylacetonate system produces a pyrolytic coating of a desired blue-gray color. This Cu/Mn/Co mixture also provides greatly improved acid resistance. The acid resistance increases to a maximum when the cobalt content of the mixture is above about 50 wt %. As discussed, this increase in acid resistance was visually determined in accordance with a conventional ASTM 282-67 test (Standard Test Method for Acid Resistance of Enamels, Citric Acid Spot Test). This increase in acid durability is believed to be caused by a higher stability of the Co/Cu/Mn matrix compared to the stability of the Cu/Mn matrix.

Iron Oxide Compositions

Iron oxide coatings pyrolytically formed on glass generally yield a bronze or gold colored film in transmission and enhance the solar performance of the glass by among other ways absorbing part of the solar spectrum in the visible region reducing the heat load through the glass. The iron oxide can be applied to hot glass by spray pyrolysis or by chemical vapor deposition. For pyrolytic coatings, the preferred method is to spray an iron containing material, such as an aqueous suspension of ferric acetylacetonate, onto the glass to form the iron oxide coating.

The color of the iron containing chromophore can be changed by adding additional metal ions to form a binary or ternary metal oxide thin film. For example, a binary Cu—Fe oxide coating tends to have a light grayish-amber color in transmission when formed on a clear glass substrate. A ternary oxide compound formed from materials e.g. acetylacetonates, of Cu, Cr and Fe produces a dark grayish-amber absorbing film on a clear glass substrate. In addition compounds having acetylacetonates of cobalt, manganese, aluminum, cerium, calcium, titanium, yttrium, zinc, zirconium and tin may be used to vary the color of the deposited film.

A problem with typical iron oxide coatings is that they tend to darken upon further heat treatment, such as tempering or bending. This darkening is believed to be caused by an increase in crystallization and grain size produced at the temperatures required for tempering or bending. While, it may be possible to add a barrier layer between the iron oxide and the glass to help prevent such darkening, this darkening can be diminished by adding a selected second component to the iron oxide system, such as, but not limiting to the invention, Ca, Cu, Al, Ce, Mg, Mn, Ti, Y, Zn, Zr.

Prevention of Darkening

A calcium acetylacetonate suspension was combined with an iron acetylacetonate suspension of different mole ratios and pyrolytically sprayed onto a heated glass substrate to form an iron calcium oxide thin film. The substrate was cleaned as previously discussed. Two pieces of clear glass 4 inches (10.2 cm) square were sprayed for the time listed in Table VI with the same molar solution listed in Table VI. One piece was heat treated. The film thicknesses were not measured. Sample F2 had a luminous transmittance $LT_A$ measured as previously discussed of 66.94%. After heat treatment, $LT_A$ was 66.85%, giving a change in $LT_A$ of less than 1%. Sample F1 which is an $FeO_x$ film deposited onto the glass piece and subsequently heat treated (650° C., 10 minutes) resulting in the coating darkening with a change in $LT_A$ of −7.65% (63.32% transmission before heating and 55.67% transmission after heating). Similar results are shown for Fe–Mg oxide and Fe—Zr oxide (Samples F4–F6) where the binary metal oxide changes much less in luminous transmittance than does the single metal oxide $FeO_x$.(F1).

TABLE VI

| Sample | Fe(III)/X Suspension Mole Ratio | Spray Time, seconds | * ill.A, 2° Y | x | y | ** ill.A, 2° ΔY | Δx | Δy |
|---|---|---|---|---|---|---|---|---|
| F1 | Fe(III) only | 12 | 63.32 | 0.4819 | 0.4186 | | | |
| F1 (htd) | Fe(III) only | | 55.67 | 0.5009 | 0.4136 | −7.65 | 0.0190 | −0.0050 |
| Sample | Fe(III)/Ca(II) Suspension Mole Ratio | Spray Time, seconds | | | | | | |
| F2 | 2 | 15 | 66.94 | 0.4782 | 0.4185 | | | |
| F2 (htd) | 2 | | 66.85 | 0.4791 | 0.4182 | −0.09 | 0.0009 | −0.0003 |
| F3 | 4 | 10 | 76.15 | 0.4688 | 0.4176 | | | |
| F3 (htd) | 4 | | 75.02 | 0.4714 | 0.4168 | −1.13 | 0.0026 | −0.0008 |
| | Fe(III)/Mg(II) Suspension | | | | | | | |

TABLE VI-continued

| Sample | Mole Ratio | Spray Time, seconds | | | | | | |
|---|---|---|---|---|---|---|---|---|
| F4 | 1 | 20 | 76.66 | 0.4625 | 0.4165 | | | |
| F4 (htd) | 1 | | 75.54 | 0.4647 | 0.4173 | −1.12 | 0.0022 | 0.0008 |
| F5 | 2 | 20 | 68.22 | 0.4723 | 0.4183 | | | |
| F5 (htd) | 2 | | 68.05 | 0.4734 | 0.4187 | −0.17 | 0.0011 | 0.0004 |

| Sample | Fe(III)Zr(IV) Suspension Mole Ratio | Spray Time, seconds | | | | | | |
|---|---|---|---|---|---|---|---|---|
| F6 | 2 | 16 | 75.31 | 0.4691 | 0.4176 | | | |
| F6 (htd) | 2 | | 75.83 | 0.4687 | 0.4175 | 0.52 | −0.0004 | 0.0000 |

*Transmitted chromaticity values for as deposited film.
**Change in transmitted chromaticity values after heat treatment at 650° C., 10 minutes.

Additional Colored Oxide Films in Transmission

Mauve/lavender colored films in transmission can be produced by $Mn_2O_3$ oxide films formed on a clear glass substrate. An $Mn_3O_4$ oxide film formed on a clear glass or quartz substrate produces a light amber color in transmission. This ambercolored film can be transformed into a mauve/lavender colored film by heating, such as by heating the coated substrate to 650° C. for 8–30 minutes. For improved aesthetics, a silicon containing barrier layer can be used to form a more uniform color. For example, a silicon oxide layer may first be deposited onto the clear float glass substrate before spraying the manganese containing acetylacetonate suspension onto the clear float glass. The silicon containing layer can be as thin as 20 nanometers. This mauve/lavender colored coating in transmittance has been found to contain mostly $Mn_2O_3$ by X-ray diffraction. The mauve/lavender coating was tested for citric acid resistant per the above mentioned ASTM 282-67 test and found to be citric acid durable.

Co—Mn Oxide systems Co(II) (colbaltic), Co(III) Mn(II), Mn(III), combinations in suspension) may be used in the practice of the invention. Two systems used were a Co(II)/Mn(II) system and a Co(III)/Mn(II) system. These systems have been found to produce coatings having transmitted colors ranging from brown to gray brown to light green to light yellow-green when viewed in transmittance by the unaided eye under fluorescent lighting conditions as the Co to Mn molar ratio in suspension is varied from 9.0–0.1 (See Table VII).

In making some of the suspensions discussed above surfactants were used. As can be appreciated by those skilled in the art, the use of surfactants have minimal if any effect on the results obtained.

TABLE VII

Reflectance and Transmittance CIE Chromaticity Coordinates for CoMn Oxide Films on Clear Glass

| Sample | Co(II)/Mn(II) Acetylacetonate Molar Ratio in Suspension | CoMn Molar Ratio in Film XRF | * ill.A, 2° | | | ** ill.A, 2° | | | *** ill.A, 2° | | |
|---|---|---|---|---|---|---|---|---|---|---|---|
| | | | Y | x | y | Y | x | y | Y | x | y |
| X1 | 9.00 | 48.73 | 13.64 | 0.4231 | 0.4058 | 8.56 | 0.4394 | 0.4184 | 69.62 | 0.4586 | 0.4135 |
| X2 | 2.33 | 5.78 | 17.39 | 0.4280 | 0.4070 | 9.69 | 0.4357 | 0.4143 | 60.37 | 0.4592 | 0.4122 |
| X3 | 1.00 | 2.02 | 14.20 | 0.4284 | 0.4024 | 8.47 | 0.4335 | 0.4066 | 67.91 | 0.4533 | 0.4123 |
| X4 | 0.43 | 0.81 | 17.35 | 0.4148 | 0.3969 | 13.46 | 0.4077 | 0.4053 | 68.98 | 0.4554 | 0.4170 |
| X5 | 0.11 | 0.24 | 15.92 | 0.4136 | 0.3964 | 13.08 | 0.4152 | 0.4047 | 74.26 | 0.4562 | 0.4157 |

| Sample | Co(III)/Mn(II) Acetylacetonate Molar Ratio in Suspension | CoMn Molar Ratio in Film XRF | Y | X | y | Y | x | y | Y | x | y |
|---|---|---|---|---|---|---|---|---|---|---|---|
| X6 | 9.00 | 19.31 | 19.01 | 0.4242 | 0.4092 | 10.77 | 0.4329 | 0.4200 | 57.87 | 0.4641 | 0.4130 |
| X7 | 2.33 | 3.96 | 15.95 | 0.4282 | 0.4053 | 9.04 | 0.4360 | 0.4115 | 63.18 | 0.4568 | 0.4122 |
| X8 | 1.00 | 1.64 | 21.95 | 0.4269 | 0.4020 | 14.24 | 0.4202 | 0.4054 | 55.25 | 0.4579 | 0.4144 |
| X9 | 0.43 | 0.66 | 16.75 | 0.4138 | 0.3965 | 13.03 | 0.4086 | 0.4052 | 71.39 | 0.4547 | 0.4168 |
| X10 | 0.11 | 0.16 | 19.27 | 0.4132 | 0.3977 | 16.32 | 0.4134 | 0.4048 | 71.17 | 0.4592 | 0.4162 |

*See TABLE I
**See TABLE I
***See TABLE I

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A coating method comprising the steps of:
   providing a copper containing coating component and a manganese containing coating component, and applying the coating components onto the surface of a heated substrate to pyrolyze a coating wherein the copper to manganese molar ratio in the coating as determined by XRF is in the range of about 0.8 to 1.2 and the coating has a blue color in transmission.

2. The method as claimed in claim 1, wherein the copper component is a copper containing acetylacetonate and the manganese component is a manganese containing acetylacetonate.

3. The method as claimed in claim 1, wherein the coating is a $Cu_{1.4}Mn_{1.6}O_4$ having a spinel-type phase.

4. The method as claimed in claim 1, including the step of providing a layer having CuO between the coating and the substrate to prevent bleaching of the coating upon heating of the coated substrate.

5. The method as claimed in claim 4, wherein the layer has a thickness in the range of 25 to 260 angstroms.

6. The method as claimed in claim 1, wherein the providing step includes adding a cobalt containing component to improve acid resistance of the coating and the blue color of the coating in transmission is a blue gray color.

7. The method as claimed in claim 6, including adding sufficient cobalt containing component such that the amount of cobalt in the coating is greater than 50 wt %.

8. The method as claimed in claim 1, wherein the manganese containing component includes manganic acetylacetonate.

9. The method as claimed in claim 1, including the step of applying a silicon containing barrier layer prior to applying the coating components.

10. The method as claimed in claim 9, wherein the silicon containing barrier layer includes silicon oxide.

11. The method of claim 1, wherein the components are applied separately.

12. The method of claim 11, wherein the copper containing component is applied before the manganese containing component.

13. The method of claim 11 wherein the manganese containing component is applied before the copper containing component.

14. The method of claim 1, wherein the providing step provides a mixture of a copper containing component and a manganese containing component and the applying step is practiced by applying the mixture to the substrate.

15. The method as claimed in claim 1, wherein the thickness of the coating is in the range of 100 to 700 angstroms.

16. The method as claimed in claim 1, wherein the copper to manganese molar ratio in the coating is in the range of about 0.8 to 1.1 determined by XRF.

17. The method as claimed in claim 1, wherein the substrate is a glass substrate.

18. The method as claimed in claim 1 wherein a majority of the coating is cubic $Cu_{1.4}Mn_{1.6}O_4$ spinal type-phase.

19. A coating method comprising the steps of:

providing a copper containing coating component and a manganese containing coating component, and applying the copper containing component onto the surface of the substrate;

heating the substrate; and applying the manganese containing component onto the surface of the heated substrate to pyrolyze a coating wherein the copper to manganese molar ratio in the coating as determined by XRF is in the range of about 0.8 to 1.2 and the coating has a blue color in transmission.

20. A coating method comprising the steps of:

providing a copper containing coating component and a manganese containing coating component, and applying the manganese containing component onto the surface of the substrate;

heating the substrate; and applying the copper containing component onto the surface of the heated substrate to pyrolyze a coating wherein the copper to manganese molar ratio in the coating as determined by XRF is in the range of about 0.8 to 1.2 and the coating has a blue color in transmission.

21. A method of preventing color bleaching, comprising the steps of:

selecting a desired coating mixture having two or more components to be deposited on a surface of a substrate, each of the components including at least positive ions of a metal;

determining the component having most mobile metal ions;

depositing a concentration gradient deterrent layer of an oxide of the most mobile metal ions on the surface of the substrate; and applying the coating mixture over the concentration gradient deterrent layer.

22. The method of claim 21 further includes the step of heating the substrate having the coating and layer wherein at least a portion of the most mobile metal ions in the concentration gradient layer diffuses into the substrate to prevent bleaching of the coating.

23. The method of claim 22 wherein the coating mixture has two components, one component contains manganese ions and the other component contains copper ions, and the copper ions diffuse into the substrate.

24. The method of claim 21 wherein the coating mixture has two components, one component contains manganese ions and the other component contains copper ions, and the most mobile ions are the copper ions.

* * * * *